United States Patent [19]

Yoshimura

[11] Patent Number: 4,861,169
[45] Date of Patent: Aug. 29, 1989

[54] TEMPERATURE SENSOR USING THERMOCOUPLE

[75] Inventor: Hiroshi Yoshimura, Osaka, Japan

[73] Assignee: Hakko Metal Industries Limited, Osaka, Japan

[21] Appl. No.: 235,225

[22] Filed: Aug. 23, 1988

[30] Foreign Application Priority Data

May 16, 1988 [JP] Japan .................... 63-120153

[51] Int. Cl.⁴ .............................. G01K 7/06
[52] U.S. Cl. .................... 374/179; 374/141; 136/228; 136/230; 136/232; 136/233
[58] Field of Search ............... 374/179, 141; 136/233, 136/232, 230, 228

[56] References Cited

U.S. PATENT DOCUMENTS

| | | | |
|---|---|---|---|
| 2,186,707 | 1/1940 | Ray | 136/233 |
| 3,232,794 | 2/1966 | Korton | 136/233 |
| 3,281,518 | 10/1966 | Stroud et al. | 136/233 X |
| 3,584,510 | 6/1971 | Harris | 374/179 |
| 3,607,447 | 9/1971 | Davis | 136/233 |
| 3,886,798 | 6/1975 | Fortune | 136/232 |
| 4,021,268 | 5/1977 | Smith | 136/228 |
| 4,128,734 | 12/1978 | Straitz, III | 136/232 |
| 4,224,461 | 9/1980 | Snyder, Jr. et al. | 374/179 X |
| 4,731,127 | 3/1988 | Itoyama | 136/237 X |
| 4,759,895 | 7/1988 | Fortune et al. | 374/179 |

FOREIGN PATENT DOCUMENTS 0967484 8/1964 United Kingdom ............... 136/233

Primary Examiner—Allan N. Shoap
Assistant Examiner—Diego F. F. Gutierrez
Attorney, Agent, or Firm—Mason, Fenwick & Lawrence

[57] ABSTRACT

A temperature sensor using a thermocouple, optimum for measurement of temperature of an object heated to a high temperature such as the tip of a soldering iron. Comprising a thermocouple formed by mutually bonding dissimilar metal materials, the junction of the dissimilar metal materials of thermocouple is covered with a good conductive metallic sleeve, and the measuring part is formed. Therefore, if an object high temperature contacts with the measuring part, the metal materials composing the thermocouple are not directly heated, and heat conduction to the metal materials is also excellent. Therefore, oxide coating due to heating rarely occurs in the measuring part, and the measuring performance of high precision may be maintained for a long period.

4 Claims, 6 Drawing Sheets

TEMPERATURE SENSOR USING THERMOCOUPLE

BACKGROUND OF THE INVENTION

1. Field of the Invention

This invention relates to a sensor for measurement of temperature, and more particularly to a temperature sensor using a thermocouple, optimum for use in measurement of temperature of an object heated to a high temperature such as the tip of a soldering iron.

2. Description of the Prior Art

As the sensor for measuring temperature, various sensors are used according to the applications, but it is general to use a thermocouple which is excellent in response where it is necessary to keep at a proper temperature while always checking the present temperature of the object.

For example, in the job for assembling electronic components such as IC in a printed circuit board or the like, soldering is usually necessary, and in this kind of soldering work, the tip temperature of the soldering iron affects the product performance greatly. Accordingly, a high precision is required in the measurement of tip temperature of the soldering iron, and various thermocouples have been proposed recently for used in measurement at high precision as the temperature sensor for the tip of the soldering iron. For example, the thermocouples shown in FIG. 7 and FIG. 8 are typical.

The thermocouple a shown in FIG. 7 is composed of dissimilar metal materials such as chromel and alumel. That is, metal plates b, c (approximately 0.2 mm in thickness 2 to 3 mm in width) composed of these dissimilar metal materials are respectively formed, and the tip part of the metal plates b, c are welded to each other, and mounting parts d, d are provided on their basal parts, and the thermocouple a is formed.

This thermocouple is mounted on the top surface of a recess for measurement e of temperature measuring apparatus, and it is used as the temperature sensor for the tip of the soldering iron.

Besides, the thermocouple f shown in FIG. 8 is composed of dissimilar metal wires g, h made of chromel and alumel mentioned above. That is, both metal wires g, h are formed in an annular shape, and their tips are formed like a cock, and the tips are hooked on each other, so that the thermocouple f is formed.

This thermocouple f is disposed on a base j possessing a recess for measurement k of temperature measuring apparatus, and a weight i is put on one metal wire h to keep tense, so as to be used as the temperature sensor for the tip of the soldering iron.

To measure the tip temperature of the soldering iron by using such temperature sensors, a junction P of the thermocouples a, f shown in FIG. 7, FIG. 8 is used as the measuring point, and the tip 10a of a soldering iron 10 to which solder H is deposited is kept in contact with this measuring point P for several seconds. Then the thermocouples a, f are heated by the tip 10a, and these thermocouples generate thermoelectromotive forces corresponding to the tip temperature of the soldering iron 10. The value of the thermoelectromotive force is converted into a value of temperature by means of analog or digital temperature processing system, and the actual value of the tip temperature of the soldering iron is measured. The measuring precision and response of the temperature at this time greatly depend on the performances of the thermocouples a, f, so that a thinner shape is requested in the former case (FIG. 7), while a thinner metal wire is needed in the latter case (FIG. 8).

In the conventional temperature sensors, however, there were following problems.

(1) The conventional temperature sensors are composed of chromel and alumel, or the like, in the measuring point of the thermocouples a, f, that is, in the junction P, and when the junction P is heated at every time of measurement of tip temperature, the surface of metal materials such as chromel and alumel is oxidized and is darkened, and a film is formed on the junction P. As a result, the tip temperature of the soldering iron 10 is not accurately transmitted to the thermocouples a, f because of this film. This tendency is further intensified as the temperature sensor is used more frequently, which may result in extreme lowering of the measuring precision, and the thermocouples a, f must be replaced early, and the service life is relatively short.

That is, if continued to measure the tip temperature of the soldering iron 10 by using the conventional thermocouples a, f, according to the experiment of the present inventors, as shown in FIG. 10, plotting the number of times of measurement of temperature on the axis of abscissas and the measured temperature on the axis of ordinates, it has been disclosed that a measuring error of about 20° C. is caused when used 50 times, with respect to the tip temperature in the initial period of measurement (the correct tip temperature) of 480° C., and about 47° C. when used 100 times. Thereafter, in proportion to the number of times of use, the measuring error is increased, and therefore the thermocouples were very short in service life, and must be replaced early.

(2) The metal materials used in conventional thermocouples a, f, such as chromel and alumel, are poor in wetting (affinity) with the solder H. Therefore, in the case of, for example, the thermocouple a composed of these metal materials, when the tip 10a of the soldering iron 10 on which solder H is deposited is fitted to the junction P, the solder H becomes like a ball on the surface of the thermocouple a (FIG. 9), and only a point contact is formed between the tip 10a and the junction P.

Therefore, the tip temperature of the soldering iron 10 could not be sufficiently transmitted to the thermocouple a, and still more since the temperature is lowered in the vicinity of the measuring point P, it was difficult to maintain a stable measuring precision.

(3) Since the thermocouple a is in a sheet form, the response can be improved by formingly thinly, but, to the contrary, when becoming thin, the mechanical strength is lowered, and it is hard to endure long-term use.

(4) For fabrication of this thermocouple a, an advanced manufacturing technology is needed, and the product is relatively expensive.

(5) In the case of the latter thermocouple f, the fabrication is relatively easy, but it is necessary to form the metal wires g, h thinly in order to raise the measuring precision. To the contrary, when the metal wires g, h are formed thinly, same as in the case of the above thermocouple a, the mechanical strength is lowered, and the wires are likely to be broken, and it is hard to withstand long-term use, and the life is short, too.

BRIEF SUMMARY OF THE INVENTION

This invention is devised in the light of the above conventional problems, and it is a primary object of this invention to present a temperature sensor using a new thermocouple capable of solving the above problems.

It is another object of this invention to present a temperature sensor capable of maintaining the measuring performance of high precision for a long period, if the thermocouple is used repeatedly for a long period, without practically forming oxide film or the like on the dissimilar metal materials to compose the thermocouple, thereby restricting the temperature drop around the measuring point.

It is a different object of this invention to present a temperature sensor capable of keeping a high temperature measuring performance, without practically lowering the temperature in the measuring part of the thermocouple, and also outstandingly enhancing the heat conduction, by allowing the molten solder to intervene easily between the tip of the soldering iron and the thermocouple, when measuring the tip temperature of the soldering iron.

It is a further different object of this invention to present a temperature sensor extended in the life of the thermocouple, by enhancing the mechanical strength of dissimilar metal materials to compose a thermocouple, and effectively preventing their disconnection or breakage.

It is still another object of this invention to present a temperature sensor capable of further extending the life, by keeping tight the contact between dissimilar metal materials composing the thermocouple, decreasing the electric resistance, and securing the junction.

It is a still further different object of this invention to present a temperature sensor low in product cost, which can be fabricated relatively easily, without requiring advanced fabrication technology in manufacture of the thermocouple.

These and other objects of this invention and the features thereof will be more clearly understood and appreciated from the following detailed description and claims taken in conjunction with the accompanying drawings.

DETAILED DESCRIPTION OF THE PREFERRED EMBODIMENTS

Figure 1:
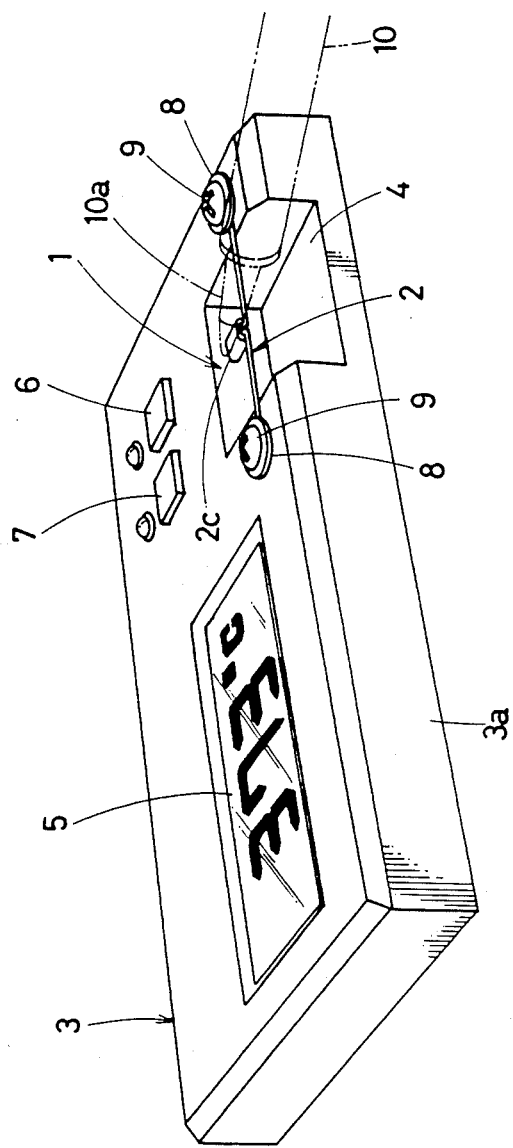
FIG. 1 is a perspective view showing a temperature measuring apparatus having a temperature sensor of embodiment 1 of this invention.

Referring now to the drawings, some of the preferred embodiments of this invention are described below.

Embodiment 1

A temperature measuring apparatus having a temperature sensor according to this invention is shown in FIG. 1, and this temperature measuring apparatus 3 is practically an instrument for measuring the temperature of the tip 10a of a soldering iron 10 used in soldering of electronic components such as IC, and a temperature sensor 1 is provided in its recess for measurement 4.

The temperature sensor 1 is composed of thermocouple 2 and compensation conductor or the like, and the thermocouple 2 is mounted tensely on the recess for measurement 4 of the temperature measuring apparatus 3.

Figure 2:
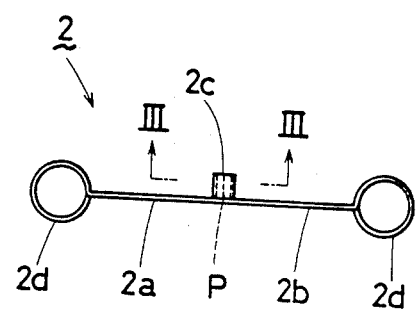
FIG. 2 is a top plan view showing a thermocouple of the temperature sensor of embodiment 1.

The thermocouple 2 is composed of two dissimilar metal wires 2a, 2b as shown in FIG. 2, and the parts at one end of the both metal wires 2a, 2b, that is, the tips are mutually joined by way of a metallic sleeve 2c. The parts at other end of the both metal wires 2a, 2b, that is, the rear ends are combined with ring-shaped mounting parts 2d, 2d integrally.

As this pair of dissimilar metal wires 2a, 2b, for example, chromel and alumel, copper and constantan, iron and constantan, chromel and constantan, or platinum and rhodium may be preferably combined, and are formed in thin wires having a wire diameter of 0.1 mm to 0.2 mm.

The metallic sleeve 2c is made of metal material excellent in wetting (affinity) with the solder, as well as excellent in heat conduction, such as copper, silver, gold, brass and iron, and copper is particularly preferable. In this case, when the outer surface of the copper sleeve 2c is plated with iron and is further plated with solder, both corrosion resistance and wettability with solder are enhanced, and it is very advantageous.

Incidentally, this metallic sleeve 2c may be formed either by folding a thin sheet in a ring shape such as cylinder as shown in the drawing, or by shaped like a closed ring.

Figure 3:
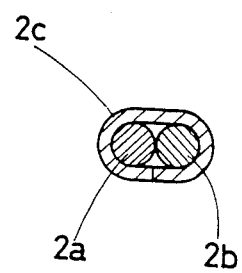
FIG. 3 is a sectional view along line III—III in FIG. 2 showing the junction of the same thermocouple.

Therefore, as shown in FIG. 3, this metallic sleeve 2c is once inserted into the joined tip parts of the two metal wires 2a, 2b, that is, in the junction P, and then crimped by means of a crimping tool or connecting tool. As a result, the junction P of the both metal wires 2a, 2b is connected in the state being covered with the metallic sleeve 2c.

This temperature measuring apparatus 3, aside from the recess for measurement 4 disposed on the case main body 3a, has switches 6, 7 arranged in a temperature display part 5, while a temperature processing system (not shown) is accommodated in the case main body 3a.

This case main body 3a is of flat shape made of synthetic resin material or the like, and part of its front edge is cut in a recess to form the recess for measurement 4, in which is seated the tip 10a of the soldering iron 10 (see double-dot chain line in FIG. 1). At the right and left outer peripheral edges of the upper part of the recess for measurement 4, connecting terminals 8, 8 having screw holes are provided. By way of mounting screws 9, 9 to be driven into these screw holes, the mounting parts 2d, 2d of the thermocouple 2 are detachably fixed. Thus, the thermocouple is tensely mounted on the recess for measurement 4, and the metallic sleeve 2c at this junction P is used as the measuring point, which is easily brought into contact with the tip 10a of the soldering iron 10.

Though not shown in the drawings, one end of the compensation conductor is connected to the connection terminals 8, 8, and this compenstaion conductor is connected to the temperature processing system built in the case main body 3a.

The temperature display part 5 is a digital display unit having a conventionally known structure, and it is disposed on the main body case 3a, and the tip temperature of the soldering iron is numerically indicated. The main switch 6 and clear switch 7 are pushbuttons, and the temperature processing system is turned on and off by the on/off switching of the main switch 6, while the present temperature indicated in the temperature display part 5 is cleared by the on/off control of the clear switch 7, so as to be ready for next temperature measurement.

The temperature processing system incorporated in the main body case 3a is, in this example, composed of amplifier, A/D converter and digital linearizer. The amplifier is connected to the compensation conductor, and it amplifies the thermoelectromotive force delivered from the thermocouple 2 of the temperature sensor 1, and sends into the A/D converter. This A/D converter the analog output from the amplifier into a digital signal, and sends it out into the digital linearizer. This digital linearizer accurately linearizes the nonlinear portion of the electromotive force curve of the thermocouple measured by the thermocouple 2, and sends out the output data into the temperature display part 5.

Meanwhile, the temperature measuring apparatus is not limited to the digital type temperature processing system, but it may be also possible to convert the thermoelectromotive force into temperature by analog system, and install a known thermometer in the main body case 3a so as to be able to read.

Explained below is the temperature measuring procedure of the tip 10a of the soldering iron 10 by the temperature measuring apparatus having thus composed temperature sensor 1.

First, solder H is deposited on a heated tip 10a of the soldering iron 10, and this tip 10a is fitted for about 5 seconds to the measuring point of the thermocouple 2 of the temperature measuring apparatus, that is, the metallic sleeve 2c.

Figure 4:
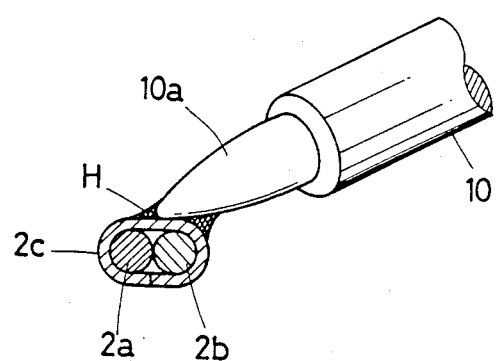
FIG. 4 is a perspective view showing a partial section for explaining the measuring method of the tip temperature of the soldering iron by the temperature sensor of embodiment 1.

Then the high heat of the tip 10a is transmitted to the metallic sleeve 2c, and the molten solder H deposits on the surface of the metallic sleeve 2c (FIG. 4).

At this time, since the metallic sleeve 2c is made of a metal material which is excellent in heat conduction and wettability with solder H, the solder H easily exists between the tip 10a and the metallic sleeve 2c, so that the surface of the metallic sleeve 2c is covered with the solder H, and a surface contact state is established between the tip 10a and metallic sleeve 2c and a sufficient contact of the two is guaranteed. Accordingly, the temperature lowering is inhibited around the measuring point of the thermocouple 2 contacting with the tip 10a, and the temperature of the tip 10a is properly transmitted to the thermocouple 2 side. In the heated thermocouple 2, a thermoelectromotive force corresponding to the temperature of the tip 10a is generated, and this electromotive force is introduced into the temperature processing system through compensation conductor, and the present measured temperature corresponding to the tip temperature is digitally indicated in the temperature display part 5.

Figure 10:
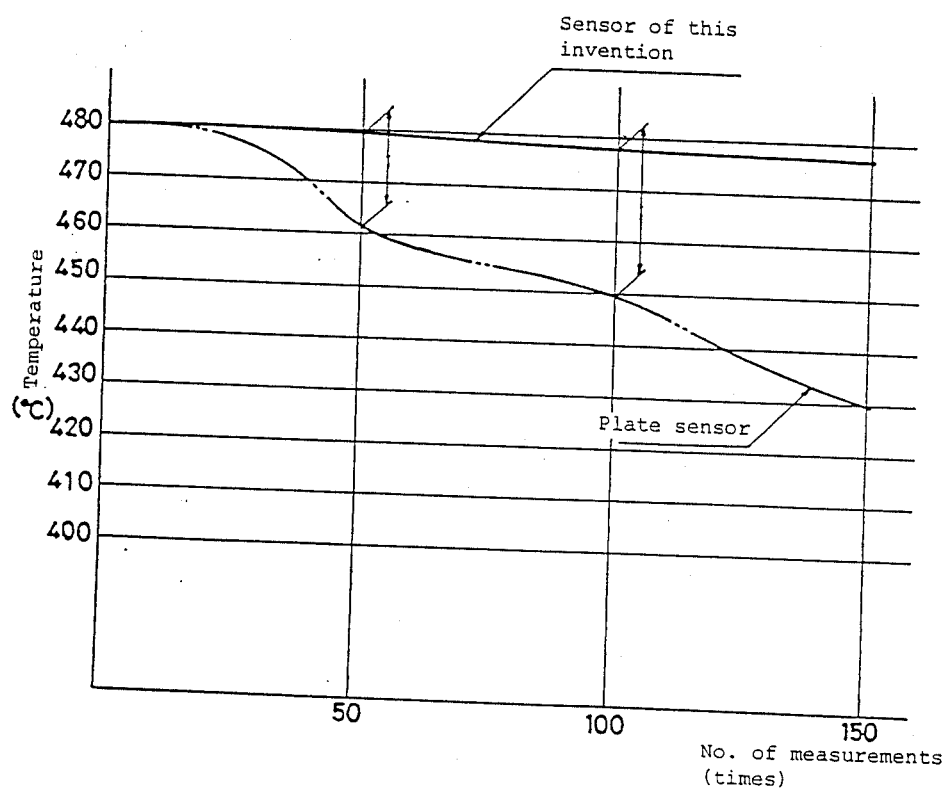
FIG. 10 is a graph showing the relation between the number of times of measurement of the temperature sensor and the measured value of the tip temperature of the soldering iron.

Incidentally, if a high temperature object such as the tip 10a of soldering iron 10 contacts with this thermocouple 2 repeatedly for a long period, since the junction P of the thermocouple 2 is covered with metallic sleeve 2c, oxidation of the surroundings of the measuring point or the metallic sleeve 2c is prevented, and the conventional problem of deterioration of heat conduction may be avoided. Therefore, if the temperature measurement lasts for a long period, that is, if measured about 100 times as shown in the graph in FIG. 10 explaining the relation between the measured value of tip temperature and the number of times of measurement, the temperature is lowered only slightly as a result of experiment. When measured furthermore, until about 150 times, the temperature at the measuring point is hardly changed, and the experiment has, disclosed that the measuring function is maintained at high precision as compared with the conventional thermocouple.

If the measured temperature is always kept at high precision in this way, for example, in the case of a soldering iron 10 for use in soldering of IC and the like on printed circuit board, the tip temperature can be accurately known by the operator, and burning of parts due to lowering of measured temperature and other conventional problems may be avoided, so that products of high quality can be produced at a superior yield.

Embodiment 2

Figure 5:
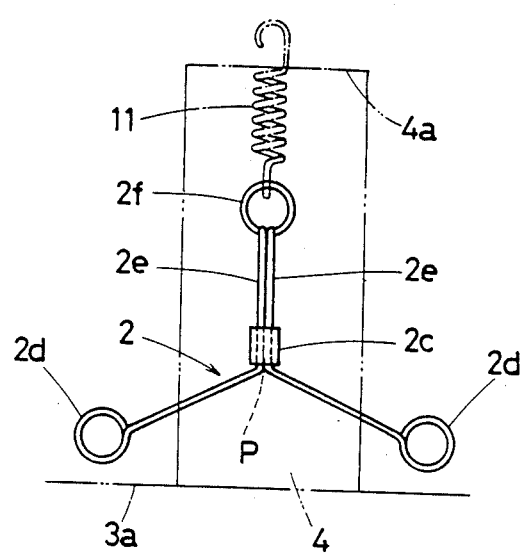
FIG. 5 is a plan view showing a thermocouple of a temperature sensor according to embodiment 2 of this invention.

This example is shown in FIG. 5, in which a tension member 11 is fitted to the thermocouple of embodiment 1.

That is, the thermocouple 2 of this embodiment has the tips of two metal wires 2a, 2b extended from their junctions P to form extensions 2e, 2e. At the front ends of these extensions 2e, 2e, rings 2f for detent are applied, and one end of the tension member 11 composed of spring is latched thereon, while the other end of the tension member 11 is detachably fixed to the inner wall 4a of the recess for measurement 4 of the temperature measuring apparatus 3 shown in FIG. 1. Thus, the thermocouple 3 is supported at three points as shown in FIG. 5, and by the elastic deformation action of the tension member 11, the pushing force (due to the tip 10a of the soldering iron 10) acting on the junction P of the thermocouple 2, that is, the metallic sleeve 2c is absorbed.

The other structure and action are same as in embodiment 1.

In such constitution, when measuring the tip temperature of soldering iron 10, if the tip 10a is fitted to the measuring part (metallic sleeve) 2c of the thermocouple 2 and a pushing force acts on the thermocouple 2 in tense state, this pushing force is completely absorbed by the elastic deformation of the spring force of the tension member 11. Therefore, disconnection of the metal wires 2a, 2b or extension 2e of the thermocouple 2 may be effectively prevented, and it is possible to withstand repeated use sufficiently.

Embodiment 3

Figure 6:
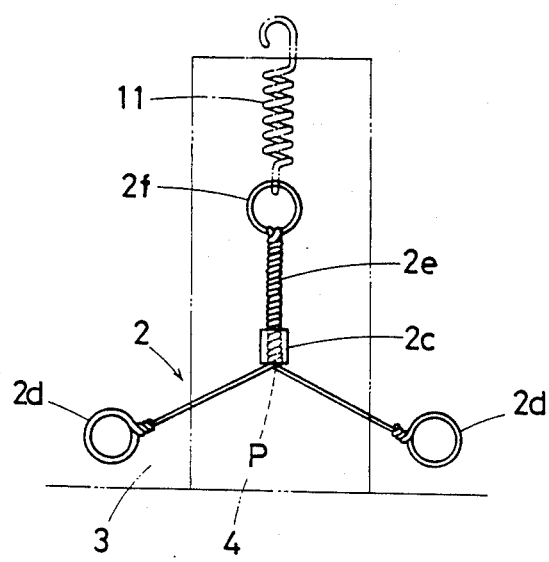
FIG. 6 is a plan view showing a thermocouple of a temperature sensor according to embodiment 3 of this invention.
Figure 7:
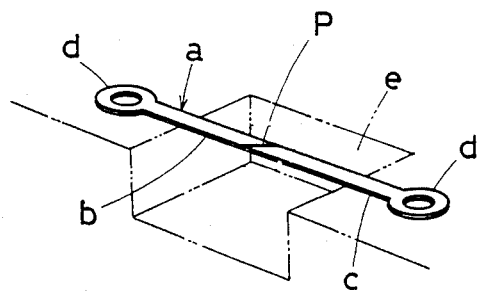
FIG. 7 is a perspective view showing a conventional temperature sensor.
Figure 8:
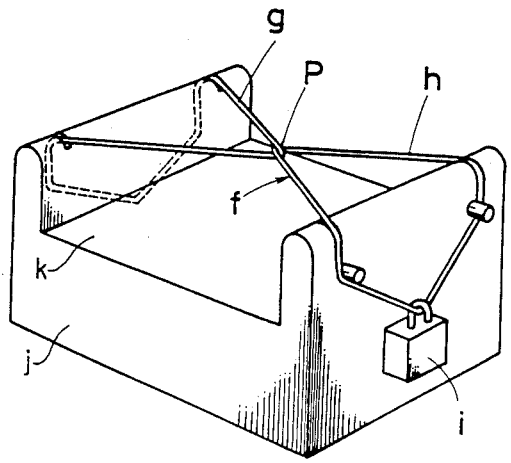
FIG. 8 is a perspective view showing another conventional temperature sensor.
Figure 9:
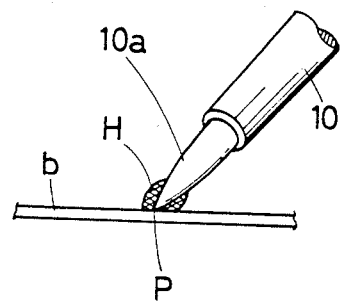
FIG. 9 is a perspective view showing the measuring state of the tip temperature of the soldering iron by the conventional temperature sensor.

This example is shown in FIG. 6, in which extensions 2e, 2e of metal wires of the thermocouple in embodiment 2 are twisted together.

That is, the thermocouple 2 of this embodiment has the extensions 2e, 2e of the two metal wires 2a, 2b shown in FIG. 5 twisted together, and the rear end of this twisting, that is, the junction P is covered with metallic sleeve 2c by crimping, and the two metal wires 2a, 2b are joined.

The other structure and action are same as in embodiment 2.

In such constitution, the contactness of the two metal wires 2a, 2b at the junction P is enhanced.

Besides, by twisting of the two metal wires 2a, 2b, the mechanical strength of the junction P and extensions 2e is intensified, and the risk of disconnection or breakage of the metal wires 2a, 2b is lowered, so that it is possible to withstand a long-term use.

In fabrication of the thermocouple 2, since the metallic wires 2a, 2b are covered with metallic sleeve 2c in twisted state, and joined by crimping, mutual coupling of the metal wires 2a, 2b becomes secure, and measures against defective junction are not needed, and the fabrication is very easy.

The junction of metal wires 2a, 2b by twisting in this embodiment relates to the extension 2e of the embodiment 2 shown in FIG. 5, but it is, as a matter of course, also applicable to joining of the junction P of embodiment 1 shown in FIG. 2. In this case, after twisting the tips of the metal wires 2a, 2b, they may be covered with metallic sleeve 2c and joined by crimping.

Incidentally, in the temperature sensor 1 using the thermocouple of the embodiment 2 and embodiment 3, the relation between the number of times of use and the measured temperature is same as in the case of embodiment 1 as disclosed in the experiment.

Thus, according to this invention, the following effects, among others, are obtained.

(1) Since the junction of the dissimilar metal materials composing the thermocouple is covered with a conductive metallic sleeve to make up the measuring part of the thermocouple, if a high temperature object contacts with this measuring part, the junction of the metal material is not directly heated, and, what is more, heat conduction to the metal material is also excellent.

Therefore, if the thermocouple is used repeatedly for a long period, oxidation of the metal material is lowered, and coating by oxidation hardly occurs. Hence, the temperature drop around the measuring point is restricted, and the measuring performance of high precision may be maintained for a long period.

(2) If the metallic sleeve is made of a metal material which is excellent in wettability with the solder, the molten solder may easily intervene between the metallic sleeve and the soldering iron when measuring the tip temperature of the soldering iron, and the heat conduction between the two is outstandingly improved, and temperature drop of the thermocouple at the measuring point hardly occurs, and a high temperature measuring performance can be maintained.

(3) The end parts of the dissimilar metal materials are projected from the junction of the thermocouple, and the projected end parts are detachably fixed to the temperature measuring part of the temperature measuring apparatus through the extension member possessing elasticity. Therefore, the pushing force when bringing the tip temperature of the soldering iron to the measuring part of the thermocouple may be effective absorbed by the elastic deformation of the tension member.

As a result, the mechanical strength of the metal material is enhanced, and disconnection or breakage may be effectively prevented, and the life of the thermocouple is extended.

(4) The end parts of the two dissimilar metal materials to compose the thermocouple are joined by twisting, and a portion of the twisted junction is covered with metallic sleeve to form the measuring part. Therefore, the contact of the metal materials is tight, and the electric resistance decreases, the junction of the two metal materials becomes secure.

Therefore, a high measuring performance of the temperature sensor is guaranteed, and the life may be further extended.

(5) The dissimilar metal materials to compose the thermocouple are metal wires, and the end parts of the two metal wires are covered with metallic sleeve to be joined together. Therefore, advanced manufacturing technology is not needed in its fabrication, and it is possible to manufacture relatively easily, and the product cost may be reduced.

The above embodiments are intended only to disclose the technical elements of this invention, and this invention should not be understood in a narrow sense of meaning by limiting to these embodiments alone, but is should be interpreted in a wider sense of meaning because various changes and modifications are possible within the spirit and scope of the claims of this invention as described herein.

What is claimed is:

1. A temperature sensor comprising: a support member,
   a thermocouple formed by mutually joining dissimilar metal materials, wherein:
   the thermocouple has opposite ends and a junction formed therebetween of two dissimilar metal materials, a portion of the junction or the two dissimilar metal materials forming said thermocouple being covered with a conductive metallic sleeve to form a temperature measuring part;
   mounting parts are formed at both ends of said thermocouple; and
   said mounting parts are detachably fixed to said temperature measuring part and the thermocouple is secured on said support member in a state of a tension, said metallic sleeve being made of a metal material which has excellent solder wettability properties, and wherein the end parts of said two metal materials are projected from the junction of said thermocouple, and the projected end parts are detachably fixed to the temperature measuring part of said temperature measuring apparatus by way of an tension member elasticity.

2. A temperature sensor according to claim 1 wherein said metallic sleeve is made of copper, and it is plated with iron on the outer circumference, and is then plated with solder.

3. A temperature sensor according to claim 1, wherein said dissimilar metal materials are metal wired, and the end parts of these two metal wires are joined together with a portion being covered with said metallic sleeve.

4. A temperature sensor according to claim 1, wherein the end parts of said two metal materials to compose said thermocouple are jointed by twisting; and a portion of the twisted junction is covered with said metallic sleeve to form said measuring part.

* * * * *